US010791088B1

(12) United States Patent
Amdahl et al.

(10) Patent No.: US 10,791,088 B1
(45) Date of Patent: Sep. 29, 2020

(54) METHODS FOR DISAGGREGATING SUBSCRIBERS VIA DHCP ADDRESS TRANSLATION AND DEVICES THEREOF

(71) Applicant: F5 Networks, Inc., Seattle, WA (US)

(72) Inventors: Saxon Amdahl, Seattle, WA (US); Gennady Dosovitsky, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 387 days.

(21) Appl. No.: 15/626,961

(22) Filed: Jun. 19, 2017

Related U.S. Application Data

(60) Provisional application No. 62/351,379, filed on Jun. 17, 2016.

(51) Int. Cl.
  *H04L 29/12* (2006.01)
  *H04L 12/741* (2013.01)
  *H04L 29/06* (2006.01)

(52) U.S. Cl.
  CPC .......... *H04L 61/2015* (2013.01); *H04L 45/74* (2013.01); *H04L 61/2503* (2013.01); *H04L 67/42* (2013.01)

(58) Field of Classification Search
  CPC ..... H04L 61/2015; H04L 45/74; H04L 67/42; H04L 61/2503
  See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Christopher P Grey
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that obtain an assigned Internet Protocol (IP) address from a DHCP server in response to an address request received from a client. One of a plurality of processing cores, on which a traffic management process is executing, is identified. The assigned IP address is modified based on the identified processing core. The modified IP address is sent to the client in response to the received address request. With this technology, connections associated with a same subscriber can advantageously be disaggregated to the same traffic management process.

16 Claims, 5 Drawing Sheets

(56) References Cited

U.S. PATENT DOCUMENTS

| | | |
|---|---|---|
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,898,876 A | 4/1999 | James |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,249,801 B1 | 6/2001 | Zisapel et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,618 B1 | 8/2002 | Cohen et al. |
| 6,434,801 B2 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 7,007,092 B2 | 2/2006 | Peiffer |
| 7,058,633 B1 | 6/2006 | Gnagy et al. |
| 7,113,993 B1 | 9/2006 | Cappiello et al. |
| 7,133,944 B2 | 11/2006 | Song et al. |
| 7,139,792 B1 | 11/2006 | Mishra et al. |
| 7,185,359 B2 | 2/2007 | Schmidt et al. |
| 7,228,422 B2 | 6/2007 | Morioka et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,383,570 B2 | 6/2008 | Pinkas et al. |
| 7,398,552 B2 | 7/2008 | Pardee et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,644,137 B2 | 1/2010 | Bozak et al. |
| 7,668,166 B1 | 2/2010 | Rekhter et al. |
| 7,689,710 B2 | 3/2010 | Tang et al. |
| 7,724,657 B2 | 5/2010 | Rao et al. |

(56) References Cited

U.S. PATENT DOCUMENTS

| | | |
|---|---|---|
| 7,725,093 B2 | 5/2010 | Sengupta et al. |
| 7,742,479 B1 * | 6/2010 | Kotha ............... H04L 12/4679 |
| | | 370/392 |
| 7,769,845 B2 | 8/2010 | Baron |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,662 B2 | 11/2010 | Clark et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,041,022 B1 | 10/2011 | Andreasen et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,172,753 B1 | 10/2015 | Jiang et al. |
| 9,246,819 B1 | 1/2016 | Thirasuttakorn |
| 9,319,921 B2 | 4/2016 | Kuroda |
| 2001/0009554 A1 | 7/2001 | Katseff et al. |
| 2001/0023442 A1 | 9/2001 | Masters |
| 2001/0052016 A1 | 12/2001 | Skene et al. |
| 2002/0010783 A1 | 1/2002 | Primak et al. |
| 2002/0027504 A1 | 3/2002 | Davis |
| 2002/0032777 A1 | 3/2002 | Kawata et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0083067 A1 | 6/2002 | Tamayo |
| 2002/0095498 A1 | 7/2002 | Chanda et al. |
| 2002/0112061 A1 | 8/2002 | Shih et al. |
| 2002/0138615 A1 | 9/2002 | Schmeling |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0058839 A1 | 3/2003 | D'Souza |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105807 A1 | 6/2003 | Thompson et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0135509 A1 | 7/2003 | Davis et al. |
| 2003/0145062 A1 | 7/2003 | Sharma et al. |
| 2003/0145233 A1 | 7/2003 | Poletto et al. |
| 2003/0163578 A1 | 8/2003 | Janssen et al. |
| 2003/0200311 A1 | 10/2003 | Baum |
| 2003/0208596 A1 | 11/2003 | Carolan et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0078487 A1 | 4/2004 | Cernohous et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0148520 A1 | 7/2004 | Talpade et al. |
| 2004/0151186 A1 | 8/2004 | Akama |
| 2004/0190522 A1 | 9/2004 | Aerrabotu et al. |
| 2004/0268358 A1 | 9/2004 | Li et al. |
| 2004/0199762 A1 | 10/2004 | Carlson et al. |
| 2004/0210663 A1 | 10/2004 | Phillips et al. |
| 2004/0225713 A1 | 11/2004 | Abbasi et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0122942 A1 | 6/2005 | Rhee et al. |
| 2005/0122977 A1 | 6/2005 | Lieberman |
| 2005/0129001 A1 | 6/2005 | Backman et al. |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2005/0288939 A1 | 12/2005 | Peled et al. |
| 2006/0002405 A1 | 1/2006 | Le Sauze et al. |
| 2006/0031520 A1 | 2/2006 | Bedekar et al. |
| 2006/0036764 A1 | 2/2006 | Yokota et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |

(56) References Cited

U.S. PATENT DOCUMENTS

| | | |
|---|---|---|
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2006/0268704 A1 | 11/2006 | Ansari et al. |
| 2006/0291483 A1 | 12/2006 | Sela |
| 2006/0294054 A1 | 12/2006 | Kudo et al. |
| 2007/0006293 A1 | 1/2007 | Balakrishnan et al. |
| 2007/0016662 A1 | 1/2007 | Desai et al. |
| 2007/0019658 A1 | 1/2007 | Park et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0255848 A1 | 11/2007 | Sewall et al. |
| 2007/0258451 A1 | 11/2007 | Bouat |
| 2007/0297410 A1 | 12/2007 | Yoon et al. |
| 2007/0297551 A1 | 12/2007 | Choi |
| 2008/0008202 A1 | 1/2008 | Terrell et al. |
| 2008/0025297 A1 | 1/2008 | Kashyap |
| 2008/0028456 A1 | 1/2008 | O'Rourke et al. |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0130812 A1 | 6/2008 | Eom et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0201331 A1 | 8/2008 | Eriksen et al. |
| 2008/0201599 A1 | 8/2008 | Ferraiolo et al. |
| 2008/0205613 A1 | 8/2008 | Lopez |
| 2008/0209053 A1 | 8/2008 | Shen et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0040926 A1 | 2/2009 | Li et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125622 A1 | 5/2009 | O'Sullivan et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0228956 A1 | 9/2009 | He et al. |
| 2009/0248893 A1 | 10/2009 | Richardson et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011420 A1 | 1/2010 | Drako et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042693 A1 | 2/2010 | Eriksson et al. |
| 2010/0071048 A1 | 3/2010 | Novak et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh et al. |
| 2010/0242092 A1 | 9/2010 | Harris et al. |
| 2010/0251330 A1 | 9/2010 | Kroeselberg et al. |
| 2010/0088417 A1 | 10/2010 | Amemiya et al. |
| 2010/0279733 A1 | 11/2010 | Karsten et al. |
| 2010/0287227 A1* | 11/2010 | Goel .................. H04L 67/1002 709/202 |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0029654 A1 | 2/2011 | Takeda et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0107077 A1 | 5/2011 | Henderson et al. |
| 2011/0141900 A1 | 6/2011 | Jayawardena et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0271005 A1 | 11/2011 | Bharrat et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0143883 A1 | 6/2012 | Chen et al. |
| 2012/0191847 A1 | 7/2012 | Nas et al. |
| 2012/0198043 A1 | 8/2012 | Hesketh et al. |
| 2012/0198512 A1 | 8/2012 | Zhou et al. |
| 2012/0210416 A1 | 8/2012 | Mihelich et al. |
| 2012/0210417 A1 | 8/2012 | Shieh |
| 2012/0224531 A1 | 9/2012 | Karuturi et al. |
| 2012/0259925 A1* | 10/2012 | Braudes .................. H04L 51/16 709/206 |
| 2012/0311153 A1 | 12/2012 | Morgan |
| 2012/0317266 A1 | 12/2012 | Abbott |
| 2013/0003106 A1 | 1/2013 | Lowery et al. |
| 2013/0029726 A1 | 1/2013 | Berionne et al. |
| 2013/0044757 A1 | 2/2013 | Rai et al. |
| 2013/0091002 A1 | 4/2013 | Christie et al. |
| 2013/0163758 A1 | 6/2013 | Swaminathan et al. |
| 2013/0198322 A1 | 8/2013 | Oran et al. |
| 2013/0205361 A1 | 8/2013 | Narayanaswamy et al. |
| 2013/0212127 A1 | 8/2013 | Kitamura |
| 2013/0297765 A1* | 11/2013 | Zisapel .................. G06F 9/505 709/223 |
| 2013/0336122 A1 | 12/2013 | Baruah et al. |
| 2013/0339429 A1 | 12/2013 | Richardson et al. |
| 2014/0040478 A1 | 2/2014 | Hsu et al. |

(56) References Cited

U.S. PATENT DOCUMENTS

| | | | |
|---|---|---|---|
| 2014/0059678 A1 | 2/2014 | Parker | |
| 2014/0095661 A1 | 4/2014 | Knowles et al. | |
| 2014/0162705 A1 | 6/2014 | de Wit et al. | |
| 2014/0171089 A1 | 6/2014 | Janakiraman et al. | |
| 2014/0269484 A1 | 9/2014 | Dankberg et al. | |
| 2014/0317404 A1 | 10/2014 | Carlson et al. | |
| 2014/0362807 A1* | 12/2014 | Bhatnagar | H04W 4/00 370/329 |
| 2015/0127830 A1 | 5/2015 | Brown et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 2003, 8 pages, (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Crescendo Networks, "Application Layer Processing (ALP)," 2003-2009, pp. 168-186, Chapter 9, CN-5000E/5500E, Foxit Software Company.

European Search Report for corresponding EP Application No. 14753736.9, dated Sep. 23, 2016, pp. 1-8.

F5 Networks Inc., "Configuration Guide for Local Traffic Management," F5 Networks Inc., Jan. 2006, version 9.2.2, 406 pgs.

F5 Networks. BIG-IP GTM and BIG-IP Link Controller, Release Notes, Jul. 20, 2015, v.11.6.0.

F5 Networks. BIG-IP Virtual, Release Notes, Dec. 8, 2014, Edition 11.6.0.

F5 Networks. BIG-IP® Global Traffic Manager™: Implementations, Manual, Aug. 20, 2014, pp. 1-118, v11.6.

F5 Networks. BIG-IP® TMOS®: Routing Administration, Manual, Apr. 10, 2015, pp. 1-140, v11.6.

F5 Networks. Local Traffic Manager and Global Traffic Manager Operations Guide, Manual, Dec. 12, 2014, pp. 1-160, v1.0.

Fielding et al., "Hypertext Transfer Protocol—HTTP/1.1," Network Working Group, RFC: 2068, Jan. 1997, pp. 1-162.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

International Search Report for International Patent Application No. PCT/US2013/026615 (dated Jul. 4, 2013).

International Search Report for International Patent Application No. PCT/US2014/018431 (dated Jul. 9, 2014).

Macvittie L., "Message-Based Load Balancing," Technical Brief, 2009, pp. 1-9, F5 Networks, Inc.

OWASP, "Testing for Cross site scripting", OWASP Testing Guide v2, Table of Contents, Sep. 5, 2013, pp. 1-5, (www.owasp.org/index.php/Testing_for_Cross_site_scripting).

Schaefer, Ken, "IIS and Kerberos Part 5—Protocol Transition, Constrained Delegation, S4U2S and S4U2P," Jul. 18, 2007, 21 pages, itnp://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

F5 Networks, Inc., "BIG-IP® Local Traffic Management: Basics", Manual, Oct. 20, 2015, pp. 1-68, version 12.0, F5 Networks, Inc.

F5 Networks, Inc., "F5 BIG-IP TMOS: Operations Guide", Manual, Mar. 5, 2015, pp. 1-238, F5 Networks, Inc.

F5 Networks, Inc., "BIG-IP® System: SSL Administration", Manual, Jul. 22, 2016, pp. 1-110, version 12.0, F5 Networks, Inc.

F5 Networks, Inc., "BIG-IP® Local Traffic Manager™: Implementations", Manual, May 25, 2016, pp. 1-284, version 12.0, F5 Networks, Inc.

* cited by examiner

METHODS FOR DISAGGREGATING SUBSCRIBERS VIA DHCP ADDRESS TRANSLATION AND DEVICES THEREOF

This application claims the benefit of U.S. Provisional Patent Application Ser. No. 62/351,379 filed Jun. 17, 2016, which is hereby incorporated by reference in its entirety.

FIELD

This technology generally relates to processing network traffic in a multiprocessor environment and, more particularly, to methods and devices for disaggregating subscribers via dynamic host configuration protocol (DHCP) address translation.

BACKGROUND

Clustered multiprocessor architectures allow the simultaneous use of multiple processors, referred to herein as processing cores, in order to increase the overall performance of a computing device. With a multiprocessor architecture, processes and threads can run simultaneously on different processing cores instead of merely appearing to run simultaneously as in single processor architectures utilizing multitasking and context switching.

One such computing device benefiting from a multiprocessor architecture is a network traffic management apparatus which can run an instance of a traffic management application on each processing core, for example. The traffic management processes can be configured to manage network traffic by performing functions, such as accounting, load balancing, rate limiting, compression, encryption, application acceleration, or packet filtering for example.

In order to distribute network traffic to a processing core of a multiprocessor architecture, to be handled by an instance of a traffic management application executing on the processing core, one or more disaggregators can be provided between the processing cores and the client devices originating the network traffic. Accordingly, the disaggregator(s) are effectively a hardware or software load balancer configured to distribute traffic flows or connections across the processing cores and traffic management application instances executing on the processing cores.

In some networks, such as carrier networks, client devices are assigned arbitrary Internet Protocol (IP) addresses. Currently, connections with the client devices are disaggregated across processing cores of a network traffic management apparatus. Accordingly, connections from multiple client devices associated with a same subscriber may be handled by different processing cores executing different instances of a traffic management application.

The separation of connections across different processing cores for client devices associated with a same subscriber is undesirable and negatively impacts the scalability and performance of the network traffic management apparatus. In one particular example, accounting relating to data usage on a carrier network for a subscriber requires more resources when the accounting functionality for different client devices associated with the subscriber is provided by different instances of a traffic management application executing on different processing cores.

SUMMARY

A method for disaggregating subscribers via Dynamic Host Configuration Protocol (DHCP) address translation implemented by a network traffic management system comprising one or more network traffic management apparatuses, DHCP server devices, client devices, or resource server devices includes obtaining an assigned Internet Protocol (IP) address from a DHCP server in response to an address request received from a client. One of a plurality of processing cores, on which a traffic management process is executing, is identified. The assigned IP address is modified based on the identified processing core. The modified IP address is sent to the client in response to the received address request.

A network traffic management apparatus that includes memory including programmed instructions stored thereon and one or more processors configured to be capable of executing the stored programmed instructions to obtain an assigned Internet Protocol (IP) address from a DHCP server in response to an address request received from a client. One of a plurality of processing cores, on which a traffic management process is executing, is identified. The assigned IP address is modified based on the identified processing core. The modified IP address is sent to the client in response to the received address request.

A non-transitory computer readable medium having stored thereon instructions for disaggregating subscribers via DHCP address translation that includes executable code, which when executed by one or more processors, causes the one or more processors to obtain an assigned Internet Protocol (IP) address from a DHCP server in response to an address request received from a client. One of a plurality of processing cores, on which a traffic management process is executing, is identified. The assigned IP address is modified based on the identified processing core. The modified IP address is sent to the client in response to the received address request.

A network traffic management system that includes one or more network traffic management apparatuses, DHCP server devices, client devices, or resource server devices including memory comprising programmed instructions stored thereon and one or more processors configured to be capable of executing the stored programmed instructions to obtain an assigned Internet Protocol (IP) address from a DHCP server in response to an address request received from a client. One of a plurality of processing cores, on which a traffic management process is executing, is identified. The assigned IP address is modified based on the identified processing core. The modified IP address is sent to the client in response to the received address request.

This technology has a number of associated advantages including providing methods, non-transitory computer readable media, network traffic management apparatuses, and network traffic management systems that improve scalability and performance of multiprocessor devices in subscriber networks. With this technology, client connections associated with a same subscriber can advantageously be disaggregated to the same traffic management processing core and associated process, thereby significantly improving processing efficiency.

DETAILED DESCRIPTION

Figure 1:
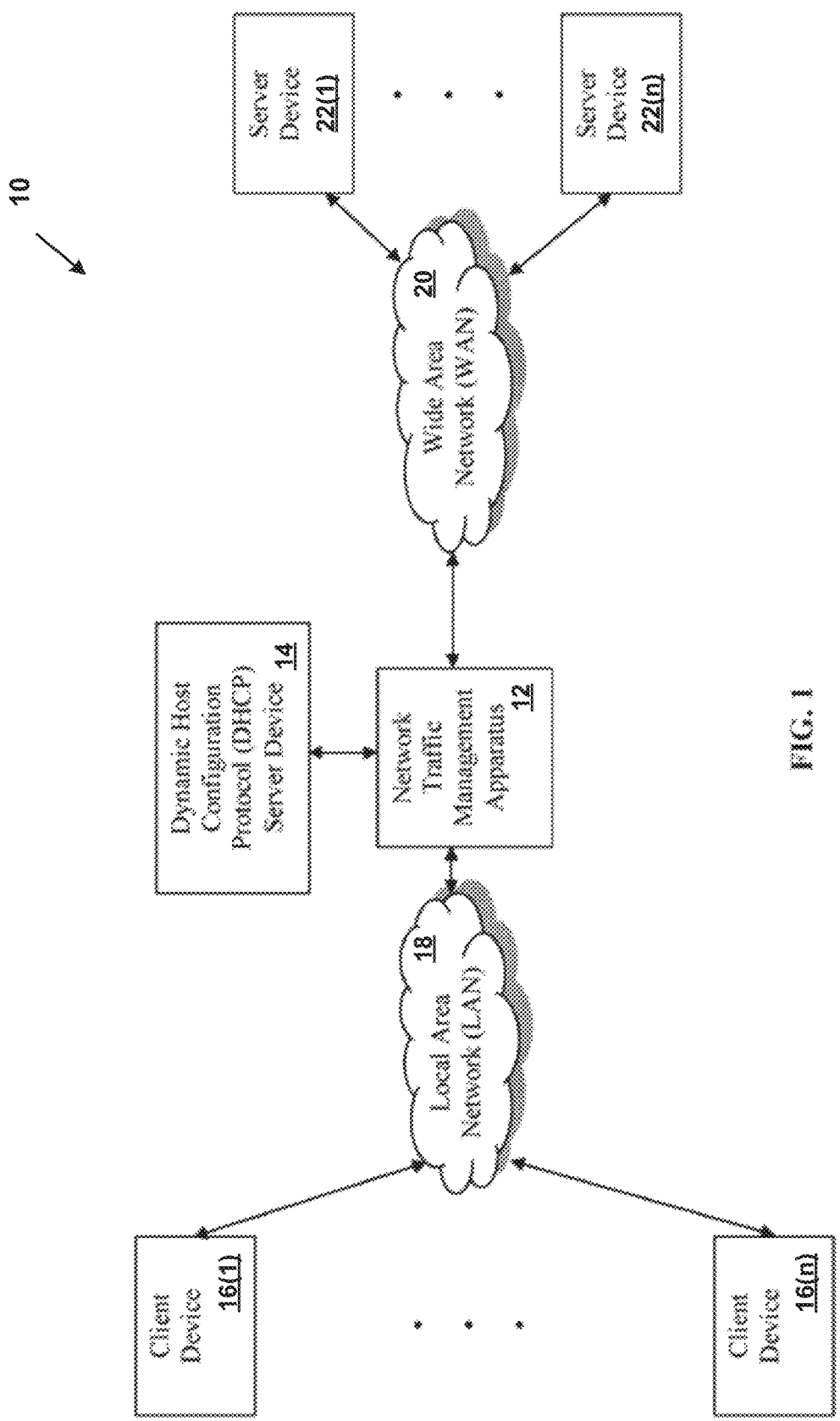
FIG. 1 is a system diagram of a network environment with an exemplary network traffic management system.

Referring to FIG. 1, an exemplary network environment, which incorporates an exemplary network traffic management apparatus 12, is illustrated. The network traffic management apparatus 12 is coupled to a dynamic host configuration protocol (DHCP) server device 14, a plurality of client devices 16(1)-16(n) via a local area network (LAN) 18, and a plurality of resource server devices 22(1)-22(n) via a wide area network (WAN) 20, although the network traffic management apparatus 12, DHCP server device 14, client devices 16(1)-16(n), and resource server devices 22(1)-22(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, network traffic management apparatuses, and network traffic management systems that advantageously disaggregate connections with client devices associated with a same subscriber to a same processing core using Internet Protocol (IP) address translation, thereby facilitating improved scalability and performance.

Figure 2:
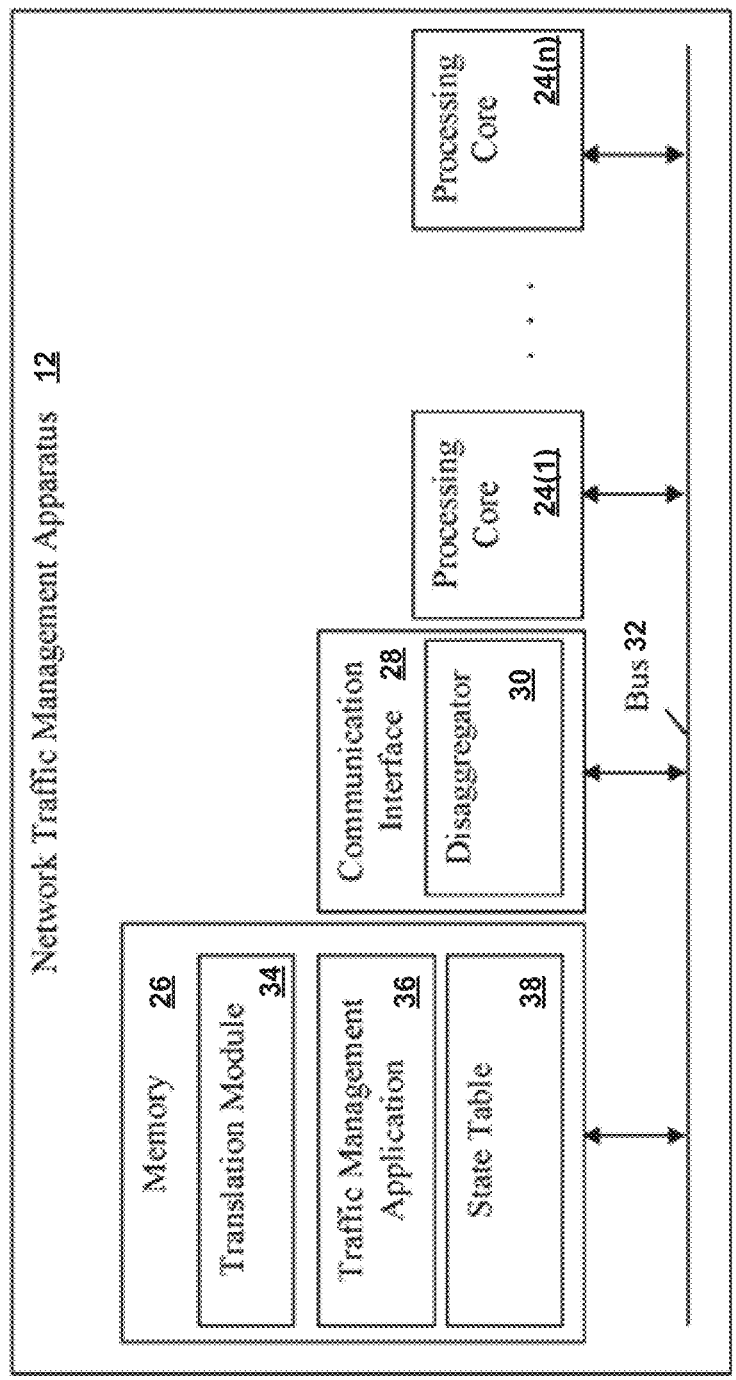
FIG. 2 is a block diagram of an exemplary network traffic management apparatus of the network traffic management system shown in FIG. 1.

Referring to FIGS. 1-2, the network traffic management apparatus 12 may perform any number of functions including accounting services, rate limiting, proxying connections, or accelerating or securing network traffic, for example. The network traffic management apparatus 12 includes a plurality of processors referred to herein as processing cores 24(1)-24(n), a memory 26, and a communication interface 28 with a disaggreagtor 30, which are coupled together by a bus 32 or other communication link, although the network traffic management apparatus 12 can include other types and numbers of elements in other configurations.

The processing cores 24(1)-24(n) of the network traffic management apparatus 12 may execute programmed instructions stored in the memory 26 of the network traffic management apparatus 12 for the any number of the functions identified above. Each of the processing cores 24(1)-24(n) may be a CPU or general purpose processor and the processing cores may be located on a same chip or on different chips in a multiprocessor architecture.

The memory 26 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 26.

Accordingly, the memory 26 of the network traffic management apparatus 12 can store one or more applications that can include computer executable instructions that, when executed by the network traffic management apparatus 12, cause the network traffic management apparatus 12 to perform actions, such as to transmit, receive, or otherwise process network messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 26 of the network traffic management apparatus 12 includes a translation module 34, a traffic management application 36, and a state table 38, although the memory 26 can include other policies, modules, databases, data structures, tables, or applications, for example. The translation module 34 in this example is configured to translate between IP addresses assigned by the DHCP server 14 and modified versions of the assigned IP addresses generated by the network traffic management apparatus 12 in order to facilitate connections between the client devices 16(1)-16(n) and the resource server devices 22(1)-22(n), as described and illustrated in more detail later.

The traffic management application 36 can be configured to provide traffic management functionality, such as accounting services in a subscriber network for example. Instances of the traffic management application 36 can be executed on the processing cores 24(1)-24(n) as processes. Each traffic management process can provide traffic management functionality for connections with the client devices 16(1)-16(n) that are disaggregated to one of the processing cores 24(1)-24(n) on which a traffic management process 36 is executing, as described and illustrated in more detail later.

The state table 38 in this example maintains an indication of each of the client devices 16(1)-16(n) for which a connection is currently maintained by an instance of the traffic management application 36 executing on one of the processing cores 24(1)-24(n) of the network traffic management apparatus 12. The indication of each of the client devices 16(1)-16(n) is associated in the state table 38 with an indication of one of the processing cores 24(1)-24(n) on which an instance of the traffic management application 36 handling the network traffic associated with the connection for each of the client devices 16(1)-16(n) is executing.

Accordingly, the state table 38 can be used by the network traffic management apparatus 12 to disaggregate connections associated with a same subscriber and multiple of the client devices 16(1)-16(n) to a same one of the processing cores 24(1)-24(n), as described and illustrated in more detail later. The state table 38 can also store a correspondence of assigned IP addresses and modified IP addresses for the client devices 16(1)-16(n) that can be used by the translation module 34.

The communication interface 28 of the network traffic management apparatus 12 operatively couples and communicates between the network traffic management apparatus 12, the DHCP server 14, client devices 16(1)-16(n), and the resource server devices 22(1)-22(n), which are all coupled together by the LAN 18 and WAN 20, although other types and numbers of communication networks or systems with other types and numbers of connections and configurations to other devices and elements can also be used.

In this particular example, the communication interface 28 includes a disaggregator 30, although the disaggregator 30 can be disposed separate from the communication interface 28 and more than one disaggregator can be provided in the network traffic management apparatus 12. The disaggregator 30 is an intelligent load balancer for distributing network traffic connections to the processing cores 24(1)-24(n) and the instances of the traffic management application 36 executing on the processing cores 24(1)-24(n), as described and illustrated in more detail later. The disaggregator 30 can be implemented in hardware, software, or any combination of hardware or software, for example.

By way of example only, the LAN 18 and/or WAN 20 can use TCP/IP over Ethernet and industry-standard protocols, although other types and numbers of protocols and/or communication networks can be used. The LAN 18 and/or WAN 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The LAN 18 and/or WAN 20 can also include direct connection(s) (e.g., for when a device illustrated in FIG. 1, such as the network traffic management apparatus 12, DHCP server device 14, client devices 16(1)-16(n), or resource server devices 22(1)-22(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the resource server devices 22(1)-22(n) or the DHCP server device 14, for example. Moreover, one or more of the devices of the network traffic management apparatus 12 in these examples can be in a same or a different communication network including one or more public, private, or cloud networks, for example.

Each of the resource server devices 22(1)-22(n) in this example includes one or more processors, a memory, and a communication interface, which are coupled together by a bus or other communication link, although other numbers and types of network devices could be used. The resource server devices 22(1)-22(n) in this example process requests received from the client devices 16(1)-16(n) via the communication network(s) according to the HTTP-based application RFC protocol, for example. Various applications may be operating on the resource server devices 22(1)-22(n) and transmitting resources (e.g., files or Web pages) to the client devices 16(1)-16(n) via the network traffic management apparatus 12 in response to requests from the client devices 16(1)-16(n). The resource server devices 22(1)-22(n) may be hardware or software or may represent a system with multiple servers in a pool, which may include internal or external networks.

Although the resource server devices 22(1)-22(n) are illustrated as single devices, one or more actions of each of the resource server devices 22(1)-22(n) may be distributed across one or more distinct network computing devices that together comprise one or more of the resource server devices 22(1)-22(n). Moreover, the resource server devices 22(1)-22(n) are not limited to a particular configuration. Thus, the resource server devices 22(1)-22(n) may contain a plurality of network computing devices that operate using a master/slave approach, whereby one of the network computing devices of the resource server devices 22(1)-22(n) operate to manage and/or otherwise coordinate operations of the other network computing devices. The resource server devices 22(1)-22(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the resource server devices 22(1)-22(n) can operate within the network traffic management apparatus 12 itself rather than as a stand-alone server device communicating with the network traffic management apparatus 12 via the WAN 20. In this example, the one or more resource server devices 22(1)-22(n) operate within the memory of the network traffic management apparatus 12.

Each of the client devices 16(1)-16(n) in this example includes any type of computing device that can request, receive, and/or render web resources including web pages, web applications, or other data, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard web browsers or standalone client applications, that may provide an interface to make requests for, and receive resources stored on, one or more of the resource server devices 22(1)-22(n) via the LAN 18 and/or WAN 20. The client devices 16(1)-16(n) may further include a display device, such as a display screen or touchscreen, and/or an input device, such as a keyboard for example.

The DHCP server device 14 in this example includes one or more processors, a memory, and a communication interface, which are coupled together by a bus or other communication link, although other numbers and types of network devices could be used. The DHCP server device 14 distributes configuration parameters to the client devices 16(1)-16(n), including IP addresses, utilizing the DHCP protocol. One of the client devices 16(1)-16(n) may be a mobile computing device on a subscriber network that requests an IP address from the DHCP server device 14 as part of configuring itself on the subscriber network, for example. In response, the DHCP server device 14 assigns an IP address to the one of the client devices 16(1)-16(n), which is intercepted by the network traffic management apparatus 12 and processed as described and illustrated in more detail later. In another example, the DHCP server device 14 is implemented as part of the network traffic management apparatus 12, such as a module within the memory 26, for example, rather than as a separate device.

Although the exemplary network environment 10 with the network traffic management apparatus 12, DHCP server device 14, client devices 16(1)-16(n), resource server devices 22(1)-22(n), LAN 18, and WAN 20 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the network traffic management apparatus 12, DHCP server device 14, client devices 16(1)-16(n), or resource server devices 22(1)-22(n), for example, may be configured to operate as virtual instances on the same physical machine. In other words, one or more of the network traffic management apparatus 12, DHCP server device 14, client devices 16(1)-16(n), or resource server devices 22(1)-22(n) may operate on the same physical device rather than as separate devices communicating through communication network(s). Additionally, there may be more or fewer network traffic management apparatuses, DHCP server device, client devices, or server devices than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of disaggregating subscribers via DHCP address translation will now be described with reference to FIGS. 1-5. Referring more specifically to FIG. 3, a method for facilitating disaggregation of client connections associated with a same subscriber across processing cores and associated traffic management application instances is illustrated.

In step 300, the network traffic management apparatus 12 receives an address request for an IP address from one of the client devices 16(1)-16(n). The one of the client devices 16(1)-16(n) can generate the address request as part of the process of configuring itself to join the LAN 18 or another communications network, such as a subscriber network associated with a carrier, for example. The address request can be directed to the DHCP server device 14, but intercepted by the network traffic management apparatus 12 in step 300.

In step 302, the network traffic management apparatus 12 proxies the address request to the DHCP server device 14 and receives a response from the DHCP server device 14. The response from the DHCP server device 14 includes an IP address assigned by the DHCP server device 14 as part of a lease that is granted to the one of the client devices 16(1)-16(n). In other examples, the network traffic management apparatus 12 can include the DHCP server device, and can therefore generate the assigned IP address, and other methods of obtaining the assigned IP address can also be used in other examples.

In step 304, the network traffic management apparatus 12 determines whether the one of the client devices 16(1)-16(n) is associated with a same subscriber as at least one other of the client devices 16(1)-16(n) for which connection(s) are currently being handled by an instance of the traffic management application 36 executing on one of the processing cores 24(1)-24(n).

In order to determine whether the one of the client devices 16(1)-16(n) is associated with a same subscriber as another one of the client devices 16(1)-16(n), the network traffic management apparatus 12 can query a database or other data structure, that is stored locally or remotely within the LAN 18 or carrier network for example, that includes identifying information for the client device(s) 16(1)-16(n) associated with each of a plurality of subscribers.

The network traffic management apparatus 12 can correlate the query results with the state table 38 in the memory 26 in order determine in step 304 whether the one of the client devices 16(1)-16(n) is associated with a same subscriber as at least one other of the client devices 16(1)-16(n) for which a connection is currently maintained. The state table 38 can be populated as described and illustrated in more detail later with reference to step 306 of FIG. 3.

In this particular example, the one of the client devices 16(1)-16(n) and the at least one other of the client devices 16(1)-16(n) are associated with a same subscriber in the context of a carrier network. However, the term subscriber as used herein includes a group, an account, or any other type of association of the client devices 16(1)-16(n) that may exist in other contexts or types of network environments. Accordingly, if the network traffic management apparatus 12 determines in step 304 that the one of the client devices 16(1)-16(n) is associated with a same subscriber as at least one other of the client devices 16(1)-16(n), then the Yes branch is taken to step 306.

In step 306, the network traffic management apparatus 12 modifies the assigned IP address based on one of the processing cores 24(1)-24(n) associated with the at least one other of the client devices 16(1)-16(n) associated with the same subscriber as the one of the client devices 16(1)-16(n). The network traffic management apparatus 12 can identify the one of the processing cores 24(1)-24(n) based on an association of the one of the processing cores 24(1)-24(n) with an indication of the at least one other of the client devices 16(1)-16(n) in the state table 38, for example, although other methods for identifying the one of the processing cores 24(1)-24(n) can also be used in other examples.

Optionally, the modified IP address hashes to an indication of the one of the processing cores 24(1)-24(n) such that the one of the processing cores 24(1)-24(n) can subsequently be determined based on an application of a hash function to the modified IP address. However, other methods for modifying the assigned IP address can also be used in other examples. The network traffic management apparatus 12 also updates the state table 38 to include an indication of the one of the client devices 16(1)-16(n) associated with the one of the processing cores 24(1)-24(n) and sends the modified IP address to the one of the client devices 16(1)-16(n) in response to the address request received in step 300.

Referring back to step 304, if the network traffic management apparatus 12 determines that the one of the client devices 16(1)-16(n) is not associated with a same subscriber as at least one other of the client devices 16(1)-16(n), then the No branch is taken to step 308. In step 308, the network traffic management apparatus 12 selects one of the processing cores 24(1)-24(n) and modifies the assigned IP address based on the one of the processing cores 24(1)-24(n).

The one of the processing cores 24(1)-24(n) can be selected randomly, based on a stored policy, or based on a load balancing decision based on the load on the processing cores 24(1)-24(n), for example, although other methods for selecting the one of the processing cores 24(1)-24(n) can also be used. Optionally, as with the IP address modified as described and illustrated earlier with reference to step 306, the IP address can be modified in step 308 to hash to an indication of the one of the processing cores 24(1)-24(n).

Additionally, in step 308, the network traffic management apparatus 12 sends the modified IP address to the one of the client devices 16(1)-16(n) in response to the address request received in step 300. Subsequent to responding to the address request in step 306 or step 308, the network traffic management apparatus 12 proceeds back to step 300 and receives another address request from another one of the client devices 16(1)-16(n), although one or more of steps 300-308 can also be performed by the network traffic management apparatus 12 in parallel for any number of the client devices 16(1)-16(n).

Figure 4:
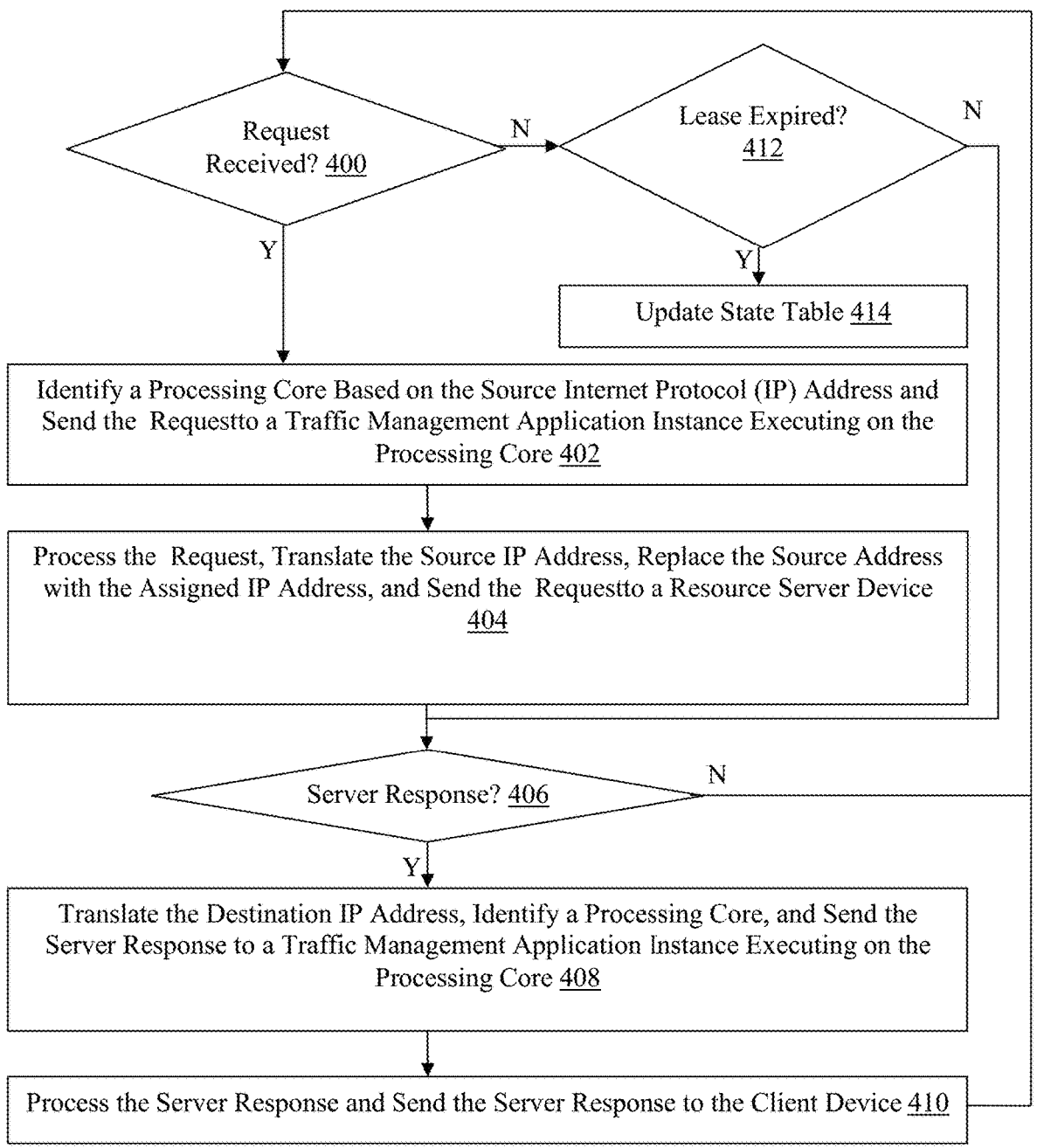
FIG. 4 is a flowchart of an exemplary method for processing client requests and server responses in order to facilitate connection persistence.

Referring more specifically to FIG. 4, a method for processing client requests and server responses in order to facilitate connection persistence is illustrated. In step 400 in this example the network traffic management apparatus 12 determines whether a request including one or more packets is received from one of the client devices 16(1)-16(n). The request can be for a web page or other web content hosted by one of the resource server devices 22(1)-22(n), for example. If the network traffic management apparatus 12 determines that a request has been received from one of the client devices 16(1)-16(n), then the Yes branch is taken to step 402.

In step 402, the network traffic management apparatus 12 identifies one of the processing cores 24(1)-24(n) based on the source IP address in the request and sends the request to an instance of the traffic management application 36 executing on the one of the processing cores 24(1)-24(n). The one of the processing cores 24(1)-24(n) can be identified, optionally by the disaggregator 30, based on applying a hash function to the source IP address, which corresponds with a modified IP address sent to the one of the client devices 16(1)-16(n) as described and illustrated earlier with reference to step 306 or 308 of FIG. 3. Other methods of identifying the one of the processing cores 24(1)-24(n) can also be used in other examples.

In step 404, the network traffic management apparatus 12 processes the request, translates the source IP address to generate an assigned IP address, replaces the source IP address in the request with the IP address assigned by the DHCP server device 14, and sends the request to one of the resource server devices 22(1)-22(n). The source IP address, which corresponds with a modified version of the assigned IP address, can be translated into the assigned IP address based on a secure network address translation (SNAT) process using an established function or the state table 38 or other data structure storing a correspondence of modified IP addresses and assigned IP addresses, for example, although other methods of translating the source IP address can also be used. The processing of the request can be performed by the instance of the traffic management application 36 executing on the one of the processing cores 24(1)-24(n) and can include performing accounting services, for example, although other types of processing can also be performed.

In step 406, the network traffic management apparatus 12 determines whether a response is received from the one of the resource server devices 22(1)-22(n) to the request sent to the one of the resource server devices 22(1)-22(n) in step 404. If the network traffic management apparatus 12 determines that a response has not been received, then the No branch is taken back to step 400 and the network traffic management apparatus 12 receives another request from the one of the client devices 16(1)-16(n) or another one of the client devices 16(1)-16(n). However, if the network traffic management apparatus 12 determines in step 406 that a response has been received, then the Yes branch is taken to step 408.

In step 408, the network traffic management apparatus 12 translates a destination IP address in the response, which corresponds to an IP address assigned by the DHCP server device 14, to obtain a modified version of the assigned IP address, identifies one of the processing cores 24(1)-24(n) based on the modified IP address, and sends the server response to an instance of the traffic management application 36 executing on the one of the processing cores 24(1)-24(n).

Figure 3:
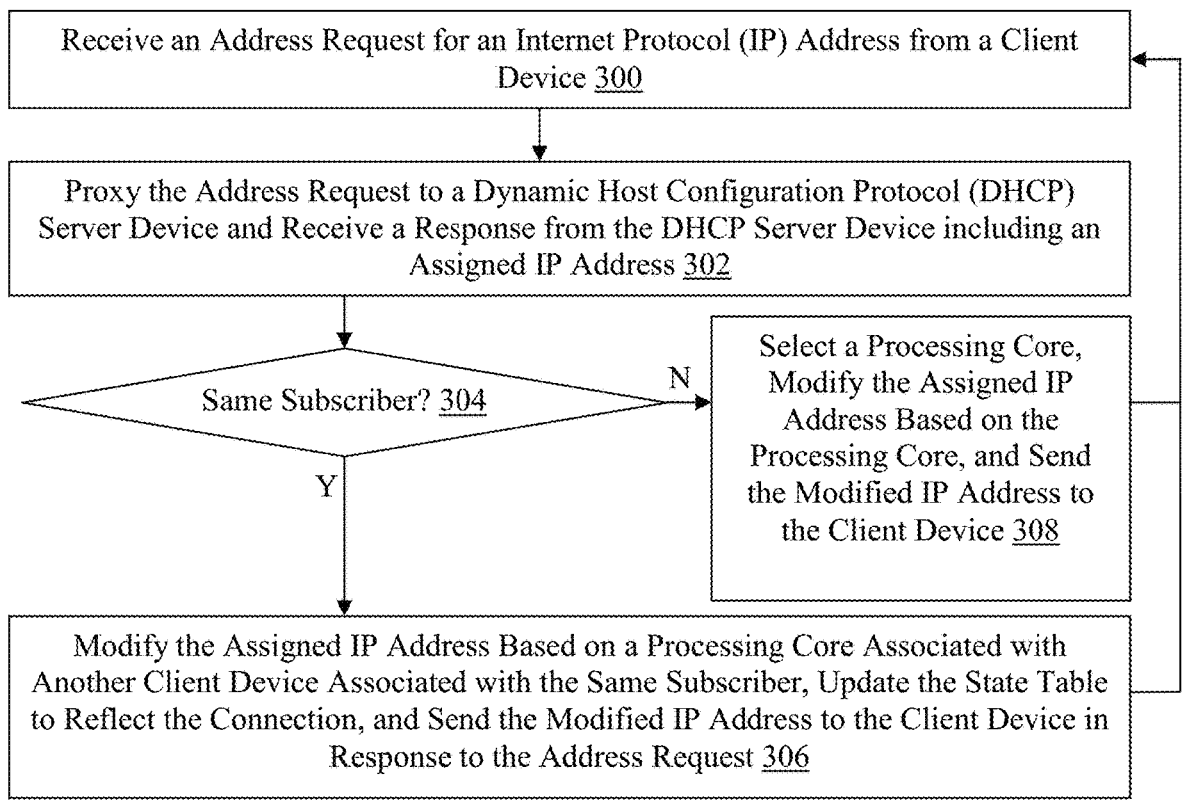
FIG. 3 is a flowchart of an exemplary method for disaggregating client connections associated with a same subscriber across processing cores and associated traffic management application instances.

Accordingly, the translation of the destination IP address results in the modified IP address sent to the one of the client devices 16(1)-16(n) as described and illustrated in more detail earlier with reference to step 306 or 308 of FIG. 3, which corresponds with the source IP address of the request received in step 400. The destination IP address can be translated into the modified IP address based on an SNAT process using an established function or the state table 38 or other data structure storing a correspondence of modified IP addresses and assigned IP addresses, for example, although other methods of translating the destination IP address can also be used.

Additionally, the one of the processing cores 24(1)-24(n) can be identified, optionally by the disaggregator 30, based on applying a hash function to the modified IP address, although other methods of identifying the one processing core can also be used in other examples. Accordingly, the one of the processing cores 24(1)-24(n) identified in step 408 will be the same as the one of the processing cores 24(1)-24(n) identified in step 404 in this example.

In step 410, the network traffic management apparatus 12 processes the response and sends the response to the one of the client devices 16(1)-16(n). The processing of the response can be performed by the instance of the traffic management application 36 executing on the one of the processing cores 24(1)-24(n) and can include performing accounting services, for example, although other types of processing can also be performed. Subsequent to sending the response to the one of the client devices 16(1)-16(n), the network traffic management apparatus 12 proceeds back to step 400 and receives another request from the one of the client devices 16(1)-16(n) or another one of the client devices 16(1)-16(n).

Referring back to step 400, if the network traffic management apparatus 12 determines that a request has not been received from one of the client devices 16(1)-16(n), then the No branch is taken to step 412. In step 412, the network traffic management apparatus 12 determines whether a lease provided by the DHCP server device 14 for one of the client devices 16(1)-16(n) has expired. If the network traffic management apparatus 12 determines that a lease has expired for one of the client devices 16(1)-16(n), then the Yes branch is taken to step 414.

In step 414, the network traffic management apparatus 12 updates the state table 38 to reflect that the lease has expired. By updating the state table 38, the network traffic management apparatus 12 may subsequently modify an assigned IP address, as described and illustrated earlier with reference to step 306 of FIG. 3, for another one of the client devices 16(1)-16(n) associated with the same subscriber, instead of modifying the assigned IP address as described and illustrated earlier with reference to step 308 of FIG. 3, when the one of the client devices 16(1)-16(n) was the only client device 16(1)-16(n) associated with a particular subscriber.

However, if the network traffic management apparatus 12 determines in step 412 that a lease for one of the client devices 16(1)-16(n) has not expired, then the No branch is taken to step 406 and the network traffic management apparatus 12 again determines whether a response is received from one of the resource server devices 22(1)-22(n). Accordingly, the network traffic management apparatus 12 effectively waits to receive a request, receive a server response, or identify a lease expiration in this particular example.

Figure 5:
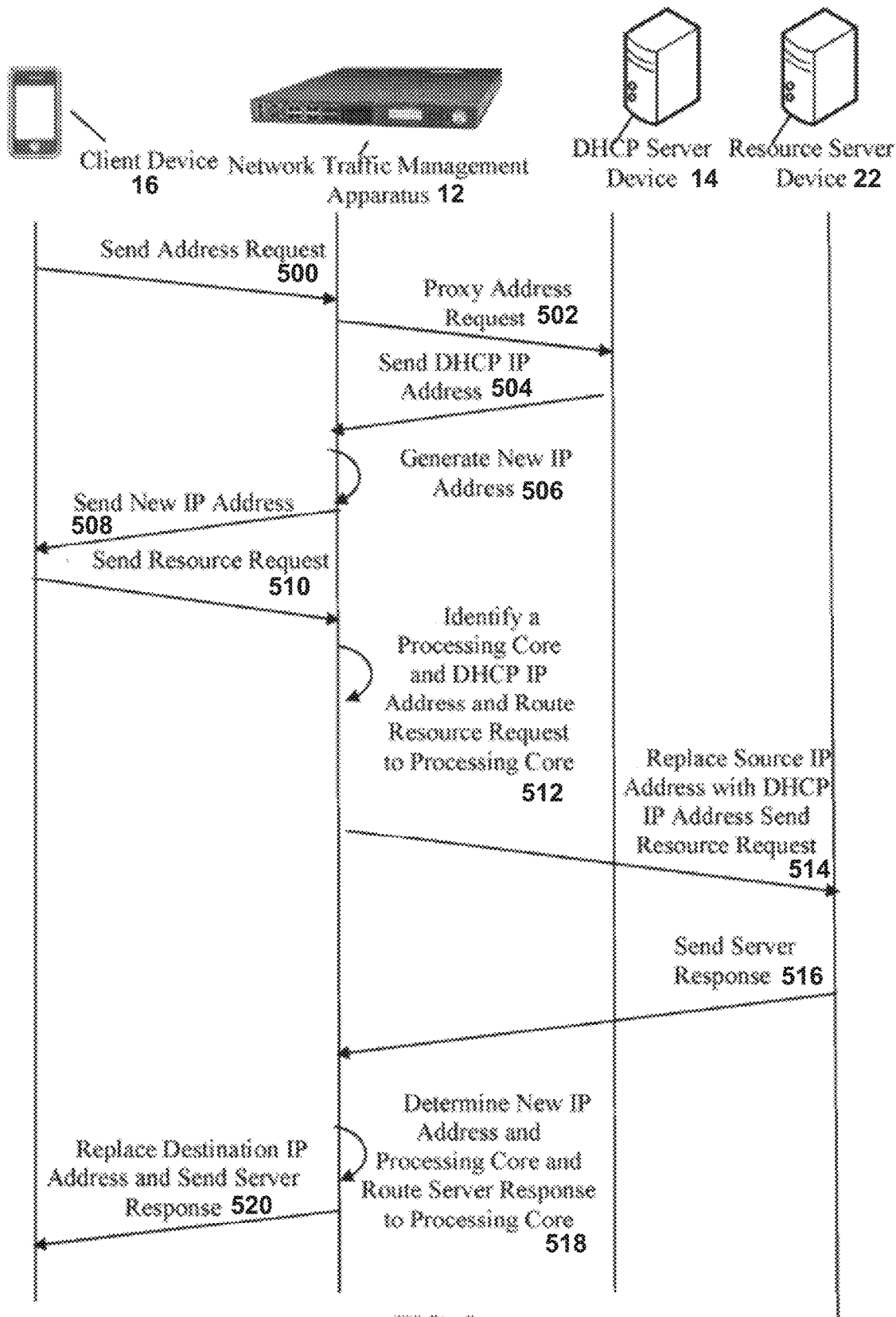
FIG. 5 is a timing diagram illustrating an exemplary method for disaggregating subscribers via DHCP address translation.

Referring more specifically to FIG. 5, a timing diagram for a method of disaggregating subscribers via DHCP address translation is illustrated. In step 500 in this example, the client device 16 sends an address request toward the DHCP server device 14, which is intercepted by the network traffic management apparatus 12. In step 502, the network traffic management apparatus 12 proxies the address request to the DHCP server device 14 and, in step 504, the DHCP server device 14 sends an assigned IP address in a response to the address request.

In step 506, the network traffic management apparatus 12 modifies the assigned IP address. The modified IP address can be generated based on a load balancing policy when the client device 16 is not associated with a same subscriber as another client device for which a connection is currently established with the network traffic management apparatus 12.

Alternatively, if the network traffic management apparatus 12 determines that the client device 16 is associated with a same subscriber as another client device 12 for which a connection is currently established, then the assigned IP address is modified based on one of the processing cores 24(1)-24(n) on which an instance of a traffic management application 36 managing the connection is executing.

In one example, the assigned IP address is modified so that it hashes to a value corresponding to the one of the processing cores 24(1)-24(n). By modifying the assigned IP address based on the one of the processing cores 24(1)-24(n), network traffic originating from the client device 16 and another client device associated with the same subscriber can advantageously be handled by the same instance of the traffic management application 36.

In step 508, the network traffic management apparatus 12 sends the modified IP address to the client device 16 in response to the address request. In step 510, the client device 16 sends a request including one or more IP packets, such as a request for a web page hosted by the resource server device 22, for example. In step 512, the network traffic management apparatus 12 identifies one of the processing cores 24(1)-24(n) of the network traffic management apparatus 12 based on the modified IP address, included in the request as a source IP address, obtains an assigned IP address, and routes the request to the identified one of the processing cores 24(1)-24(n). The one of the processing cores 24(1)-24(n) can be identified by applying a hash function to the source IP address in the request, which corresponds to the modified IP address generated in step 506. The assigned IP address can be obtained based on a SNAT using a function or a state table 38, for example.

In step 514, the network traffic management apparatus 12 replaces the source IP address in the request with the assigned IP address and sends the request to the resource server device 22. Optionally, the instance of the traffic management application 36 executing on the one of the processing cores 24(1)-24(n) of the network traffic management apparatus 12 also processes the request, such as to provide accounting services, for example.

In step 516, the resource server device 22 sends a response including one or more packets and having a destination IP address corresponding to the assigned IP address. In step 518, the network traffic management apparatus 12 intercepts the response, obtains the modified IP address, identifies one of the processing cores 24(1)-24(n) based on the modified IP address, and routes the response to the identified one of the processing cores 24(1)-24(n). The modified IP address can be determined from the assigned IP address based on a SNAT using a function or a state table 38, for example, and the one of the processing cores 24(1)-24(n) can again be identified based on an application of a hash function to the modified IP address.

In step 520, the network traffic management apparatus 12 replaces the destination IP address in the response with the modified IP address and sends the response to the client device 16 in response to the request. Optionally, the instance of the traffic management application 36 executing on the one of the processing cores 24(1)-24(n) of the network traffic management apparatus 12 can also process the response, such as to provide accounting services, for example.

With this technology, connections associated with a same subscriber and originating with different client devices can advantageously be disaggregated to the same traffic management process on an intermediary network traffic management apparatus. Since all network traffic associated with client devices corresponding to a same subscriber are handled by the same traffic management process, traffic management services, such as accounting services, can advantageously be provided more efficiently using fewer resources, and scalability of network traffic management apparatuses is improved with this technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for disaggregating subscribers via Dynamic Host Configuration Protocol (DHCP) address translation implemented by a network traffic management system comprising one or more network traffic management apparatuses, DHCP server devices, or resource server devices, the method comprising:
assigning two client addresses in response to one address request received from a client, wherein assigning the two client addresses comprises:
obtaining a DHCP-assigned Internet Protocol (IP) address from a DHCP server;
selecting one of a plurality of processing cores to process network traffic associated with the client using a traffic management process is executing on the selected processing core; and
modifying the DHCP-assigned IP address, based on the selected processing core, to generate a modified IP address;
sending the modified IP address to the client in response to the received address request;
receiving a subsequent request from the client, the request comprising the modified IP address in a source address field;
identifying the selected processing core using the modified IP address;
sending the subsequent request to the traffic management process executing on the selected processing core;
translating the modified IP address to obtain the DHCP-assigned IP address;
replacing the modified IP address in the source address of the subsequent request with the DHCP-assigned IP address to generate a translated subsequent request; and
sending the translated subsequent request to a resource server.

2. The method of claim 1, wherein the selected processing core is selected because network traffic associated with another client associated with a same subscriber as the client is assigned to be processed by the selected processing core.

3. The method of claim 1, wherein modifying the DHCP-assigned IP address, based on the selected processing core, comprises choosing the modified IP address to hash to an indication of the selected processing core when a hash function is applied to the modified IP address.

4. The method of claim 1, further comprising:
receiving a response to the translated subsequent request from the resource server, the response comprising the DHCP-assigned IP address in a destination address field;
translating the DHCP-assigned IP address to the modified IP address;
identifying the selected processing core using the modified IP address;
sending the response to the traffic management process executing on the selected processing core;
replacing the DHCP-assigned IP address in the destination address of the response with the modified IP address to generate a translated response; and
sending the translated response to the client.

5. A network traffic management apparatus, comprising memory comprising programmed instructions stored thereon and one or more processors configured to execute the stored programmed instructions, wherein the instructions, upon execution, cause the network traffic management apparatus to:
assign two client addresses in response to one address request received from a client, wherein assigning the two client addresses comprises:
obtain a Dynamic Host Configuration Protocol (DHCP)-assigned Internet Protocol (IP) address from a DHCP server;
select one of a plurality of processing cores to process network traffic associated with the client using a traffic management process is executing on the selected processing core; and
modify the DHCP-assigned IP address based on the selected processing core, to generate a modified IP address;
send the modified IP address to the client in response to the received address request;
receive a subsequent request from the client, the request comprising the modified IP address in a source address field;
identify the selected processing core using the modified IP address;
send the subsequent request to the traffic management process executing on the selected processing core;
translate the modified IP address to obtain the DHCP-assigned IP address;
replace the modified IP address in the source address of the subsequent request with the DHCP-assigned IP address to generate a translated subsequent request; and
send the translated subsequent request to a resource server.

6. The network traffic management apparatus of claim 5, wherein the selected processing core is selected because network traffic associated with another client associated with a same subscriber as the client is assigned to be processed by the selected processing core.

7. The network traffic management apparatus of claim 5, wherein modifying the DHCP-assigned IP address, based on the selected processing core, comprises choosing the modified IP address to hash to an indication of the selected processing core when a hash function is applied to the modified IP.

8. The network traffic management apparatus of claim 5, wherein the instructions, upon execution, further cause the network traffic management apparatus to:
receive a response to the translated subsequent request from the resource server, the response comprising the DHCP-assigned IP address in a destination address field;
translate the DHCP-assigned IP address to the modified IP address;
identify the selected processing core using the modified IP address;
send the response to the traffic management process executing on the selected processing core;
replace the DHCP-assigned IP address in the destination address of the response with the modified IP address to generate a translated response; and
send the translated response to the client.

9. A non-transitory computer readable medium having stored thereon instructions for disaggregating subscribers via Dynamic Host Configuration Protocol (DHCP) address translation comprising executable code which when executed by one or more processors, causes the one or more processors to:

assign two client addresses in response to one address request received from a client, wherein assigning the two client addresses comprises:
  obtain a DHCP-assigned Internet Protocol (IP) address from a DHCP server;
  select one of a plurality of processing cores to process network traffic associated with the client using a traffic management process executing on the selected processing core; and
  modify the DHCP-assigned IP address, based on the selected processing core, to generate a modified IP address;
send the modified IP address to the client in response to the received address request receive a subsequent request from the client, the request comprising the modified IP address in a source address field;
identify the selected processing core using the modified IP address;
send the subsequent request to the traffic management process executing on the selected processing core;
translate the modified IP address to obtain the DHCP-assigned IP address;
replace the modified IP address in the source address of the subsequent request with the DHCP-assigned IP address to generate a translated subsequent request; and
send the translated subsequent request to a resource server.

10. The non-transitory computer readable medium of claim 9, wherein the selected processing core is selected because network traffic associated with another client associated with a same subscriber as the client is assigned to be processed by the selected processing core.

11. The non-transitory computer readable medium of claim 9, wherein modifying the DHCP-assigned IP address, based on the selected processing core, comprises choosing the modified IP address to hash to an indication of the selected processing core when a hash function is applied to the modified IP.

12. The computer readable memory of claim 9, wherein the instructions further comprise executable code which when executed by one or more processors, causes the one or more processors to:
  receive a response to the translated subsequent request from the resource server, the response comprising the DHCP-assigned IP address in a destination address field;
  translate the DHCP-assigned IP address to the modified IP address;
  identify the selected processing core using the modified IP address;
  send the response to the traffic management process executing on the selected processing core;
  replace the DHCP-assigned IP address in the destination address of the response with the modified IP address to generate a translated response; and
  send the translated response to the client.

13. A network traffic management system, comprising one or more network traffic management apparatuses, Dynamic Host Configuration Protocol (DHCP) server devices, or resource server devices, the network traffic management system comprising memory comprising programmed instructions stored thereon and one or more processors configured to execute the stored programmed instructions to:
  assign two client addresses in response to one address request received from a client, wherein assigning the two client addresses comprises:
    obtain a DHCP-assigned Internet Protocol (IP) address from a DHCP server;
    select one of a plurality of processing cores to process network traffic associated with the client using a traffic management process is executing on the selected processing core; and
    modify the DHCP-assigned IP address, based on the selected processing core, to generate a modified IP address;
  send the modified IP address to the client in response to the received address request;
  receive a subsequent request from the client, the request comprising the modified IP address in a source address field;
  identify the selected processing core using the modified IP address;
  send the subsequent request to the traffic management process executing on the selected processing core;
  translate the modified IP address to obtain the DHCP-assigned IP address;
  replace the modified IP address in the source address of the subsequent request with the DHCP-assigned IP address to generate a translated subsequent request; and
  send the translated subsequent request to a resource server.

14. The network traffic management system of claim 13, wherein the selected processing core is selected because network traffic associated with another client associated with a same subscriber as the client is assigned to be processed by the selected processing core.

15. The network traffic management system of claim 13, wherein modifying the DHCP-assigned IP address, based on the selected processing core, comprises choosing the modified IP address to hash to an indication of the selected processing core when a hash function is applied to the modified IP address.

16. The network traffic management system of claim 13, wherein the one or more processors are further configured to execute the stored programmed instructions to:
  receive a response to the translated subsequent request from the resource server, the response comprising the DHCP-assigned IP address in a destination address field;
  translate the DHCP-assigned IP address to the modified IP address;
  identify the selected processing core using the modified IP address;
  send the response to the traffic management process executing on the selected processing core;
  replace the DHCP-assigned IP address in the destination address of the response with the modified IP address to generate a translated response; and
  send the translated response to the client.

* * * * *